Sept. 4, 1951  M. NEUHAUS  2,566,355
PROCESS OF PREPARING OLEFIN CHLOROHYDRINS
Filed July 9, 1948  2 Sheets-Sheet 2
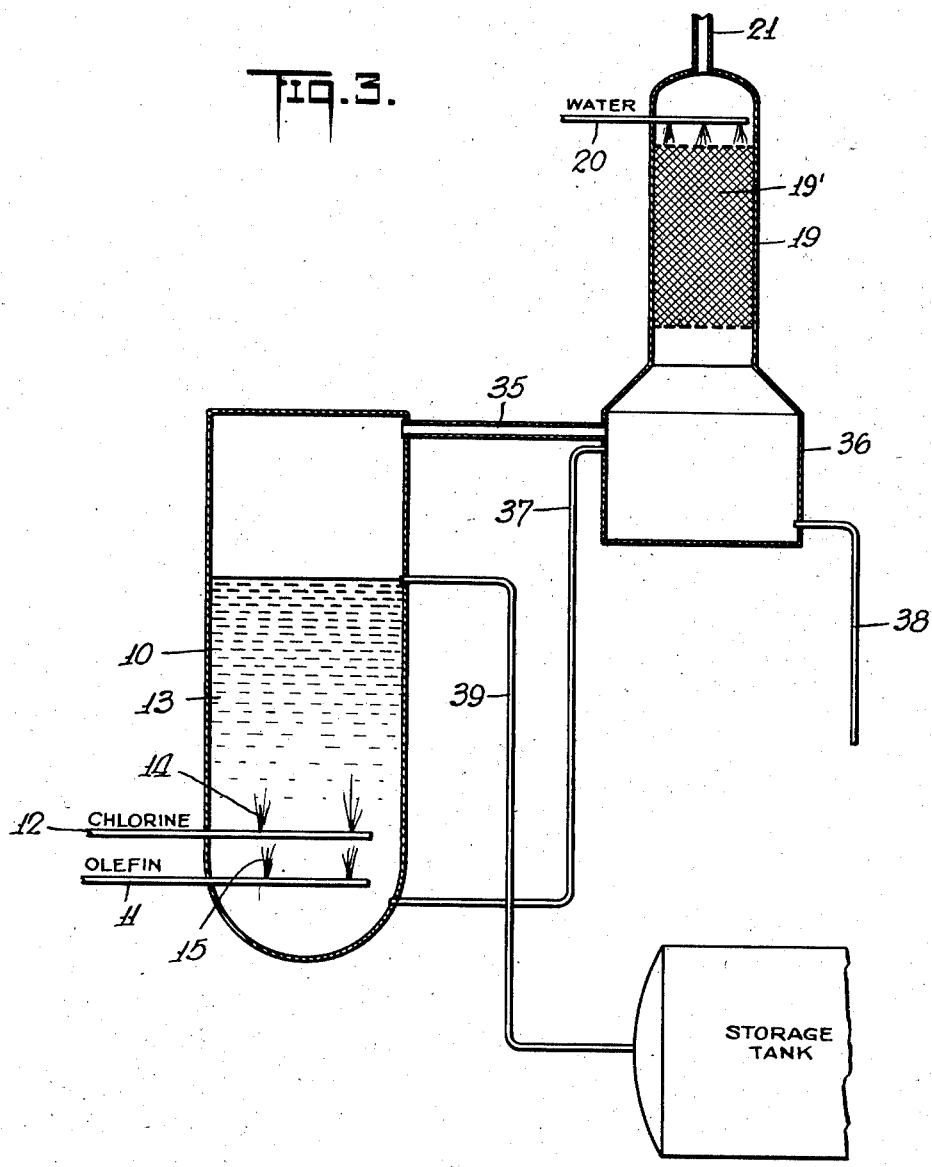
INVENTOR
Max Neuhaus
BY
Benjamin Sweedler
ATTORNEY Sept. 4, 1951　　　　　　　M. NEUHAUS　　　　　　　2,566,355
PROCESS OF PREPARING OLEFIN CHLOROHYDRINS
Filed July 9, 1948　　　　　　　　　　　　　　2 Sheets-Sheet 1
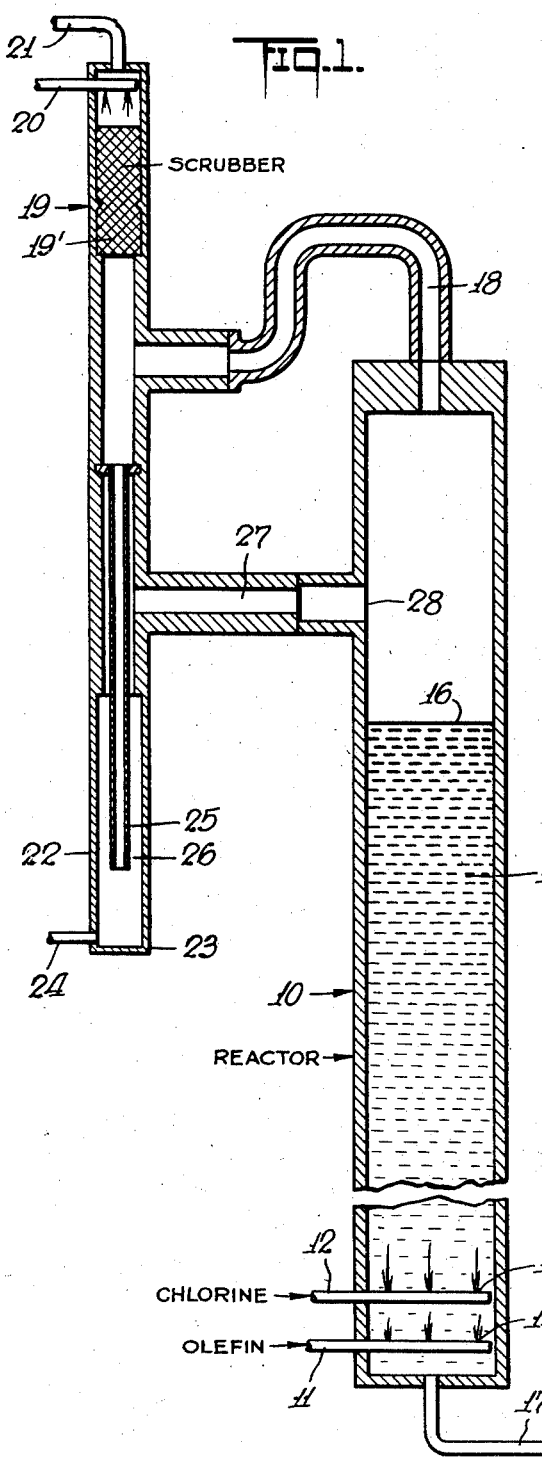
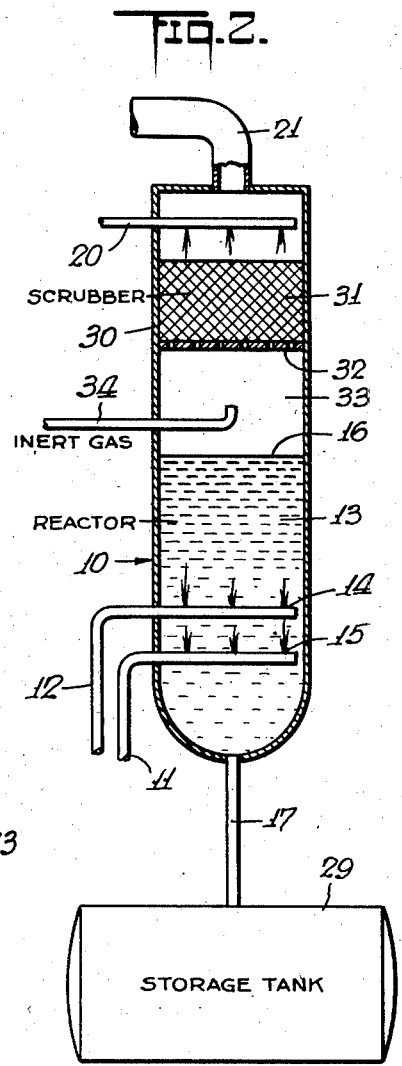
INVENTOR
Max Neuhaus
BY
Benjamin Sweedler
ATTORNEYS Patented Sept. 4, 1951

2,566,355

UNITED STATES PATENT OFFICE 2,566,355

PROCESS OF PREPARING OLEFIN CHLOROHYDRINS

Max Neuhaus, Pleasantville, N. Y., assignor to Jefferson Chemical Company, Inc., New York, N. Y., a corporation of Delaware Application July 9, 1948, Serial No. 37,924

19 Claims. (Cl. 260—634)

1

This invention relates to the production of olefin chlorohydrins such as ethylene, propylene, or mixtures of ethylene and propylene chlorohydrins and relates more particularly to the production of ethylene chlorohydrin.

Processes of producing ethylene chlorohydrin involving the introduction of a stream of ethylene containing gas and chlorine into a body of dilute aqueous hypochlorous acid introduced as such or produced by reaction of water with chlorine are well known. In general such processes involve the introduction of a dilute stream of ethylene, e. g., one containing up to 30 to 40 mol percent. ethylene, the stream usually containing a preponderating amount of saturated hydrocarbons, such as methane and ethane, into the aqueous solution of hypochlorous acid and the withdrawal of an ethylene chlorohydrin solution of about 6% by weight concentration. Operating under such conditions little difficulty is encountered from the standpoint of obtaining diffusion of the gaseous reactants in the aqueous solution of hypochlorous acid and reaction of the diffused reactants. Such operations, however, involve certain obvious disadvantages, e. g., the reactor must be designed to accommodate the large volume of inert gas mixed with the olefin with consequent (a) increased cost of the reactor, (b) increased power consumption for effecting flow of the reactants into and through and withdrawal of the reaction products from the reactor, and (c) material reduction in the capacity of the reactor.

When it is attempted to pass a relatively concentrated ethylene gas stream, say one containing 50 mol percent or more of ethylene through a body of aqueous hypochlorous acid solution to which chlorine and water are supplied, after a relatively short period of time dispersion and diffusion of the reactants into the body of aqueous hypochlorous acid solution are impaired and substantial volumes of the reactant gases pass through the body of solution without reaction taking place, resulting in a material reduction in the yield of the desired ethylene chlorohydrin. The same phenomenon takes place when concentrated propylene or concentrated mixtures of ethylene and propylene are passed into a body of aqueous hypochlorous acid.

It is among the objects of this invention to provide a process for producing olefin chlorohydrins which obviates or overcomes the difficulties heretofore encountered when using relatively concentrated streams of ethylene, propylene, or mixtures of ethylene and propylene.

Another object of this invention is to provide

2 a process of producing olefin chlorohydrin which is of high capacity and efficiency, particularly in that relatively high yields of the chlorohydrins are obtained and the chlorohydrin solution produced is practically free of dichloride invariably formed as a by-product.

Other objects and advantages of this invention will be apparent from the following detailed description thereof.

In accordance with this invention chlorine and a relatively concentrated stream of an olefin of the group consisting of ethylene, propylene and mixtures of ethylene and propylene are diffused into a body of an aqueous solution of hypochlorous acid to which body water is continuously added, and the diffused reactants caused to react to produce olefin chlorohydrins, the concentration of by-product olefin dichloride within the zone of the body of hypochlorous acid in which the reactants are diffused being carefully controlled so that a separate liquid phase of olefin dichloride does not form in this zone.

Control of the concentration of olefin dichloride in the zone in which the chlorine and olefin are diffused may be effected by removing the olefin dichloride to prevent its concentration exceeding the point where a separate liquid phase of olefin dichloride tends to form in this zone. For example, where the process is carried out by passing olefin and chlorine into a body of hypochlorous acid, scrubbing the reaction gases with water and passing the scrubber liquid from the scrubber into the body of hypochlorous acid, an inert gas such as carbon dioxide, nitrogen, flue gas, natural gas, methane, ethane, or air may be introduced above the liquid surface in the reactor and passed in contact with the scrubber liquid along with the inert and unreacted gases leaving the reactor before the scrubber liquid is introduced into the body of aqueous hypochlorous acid into which the chlorine and olefin gases are diffused to remove olefin dichlorides from this liquid and thereby prevent the formation of a separate phase of olefin dichloride in the zone in which the chlorine and olefin are diffused. Alternatively, the suspension produced by scrubbing the reactant gases with water may be permitted to settle to form water and olefin dichloride layers, the supernatant water layer passed to the reactor and the olefin dichloride layer withdrawn.

Surprisingly, it has been found that by preventing the formation of a separate liquid phase of olefin dichloride in the zone of the body of aqueous hypochlorous acid in which chlorine and a concentrated stream of olefin containing in excess of 50 mol percent., preferably in excess of 65 mol percent., ethylene, propylene, or mixtures of ethylene and propylene are diffused, the reaction between the olefin, chlorine and water takes place smoothly to produce olefin chlorohydrin in high yield. While the reason for this is not positively known, it is believed that the introduction of chlorine and a relatively concentrated olefin gas into a body of aqueous hypochlorous acid to which water is continuously added inevitably results in the formation of by-product olefin dichloride, the concentration of which soon reaches the point where it impairs the dispersion of the olefin and chlorine within the body of hypochlorous acid, causing large amounts of these gases to pass through the reaction zone in unreacted condition with consequent diminution of the yield of the desired chlorohydrins. By preventing the concentration of olefin dichloride from building up in the zone where the olefin and chlorine are diffused to the point such that a separate liquid phase of ethylene dichloride tends to form in this zone, the olefin and chlorine diffuse throughout the body of aqueous hypochlorous acid and react substantially completely to produce the desired chlorohydrin. Although there is good reason to believe the theory set forth above is correct, it is understood this invention is not to be limited by any statements of theory or explanation. In operation this process involving the continuous introduction of chlorine, water and a relatively concentrated stream of an olefin from the group consisting of ethylene, propylene, or mixtures of ethylene and propylene into a body of aqueous hypochlorous acid while preventing the formation of a separate phase of olefin dichloride in the zone of the body of hypochlorous acid in which the olefin and chlorine are diffused results in continuous uninterrupted operation with high yields of olefin chlorohydrin.

The accompanying drawings forming a part of this specification show for purposes of exemplification preferred forms of apparatus for practicing the process of this invention. In these drawings:

Figure 1 is a diagrammatic vertical sectional view partly in elevation showing one form of reactor and scrubber for practicing the process of this invention;

Figure 2 is a fragmentary diagrammatic vertical sectional view partly in elevation showing a modified form of reactor for practicing the process of this invention; and Figure 3 is a diagrammatic vertical sectional view showing still another modified form of reactor and scrubber for practicing the process of this invention.

Referring to Figure 1 of the drawing, 10 indicates a reactor which may desirably be in the form of an elongated cylindrical vessel having at its base an olefin inlet line 11 and a chlorine inlet line 12. These lines extend into the body 13 of aqueous hypochlorous acid maintained in this reactor. Chlorine line 12 is provided with diffusing thimbles 14 and olefin line 11 with diffusing thimbles 15 for diffusing the reactants through the body of liquid within the reactor. The portion of the body 13 of aqueous hypochlorous acid extending from the chlorine diffusing thimbles 14 to below the level of body 13 in which gas bubbles exist is the zone in which reaction of olefin and chlorine takes place where it has been found important to prevent the formation of a separate liquid phase of olefin dichloride. This zone extends a substantial distance above thimbles 14; the exact extent will depend on the dimensions of the reactor used. The level of the top of the body of liquid 13 maintained in reactor 10 is indicated by reference character 16. Olefin chlorohydrin reaction product is withdrawn through a line 17 leading from the base of reactor 10.

Reactor 10 is provided at its top with an exit line 18 through which the reaction gases pass. Line 18 communicates with a scrubber 19 provided with suitable packing 19'; the gases rising through 19 are scrubbed with water admitted through line 20 disposed at the top of scrubber 19. The scrubbed reaction gas exits from scrubber 19 through line 21. The suspension thus formed in scrubber 19 flows downwardly into a decanter section 22 consisting of an outer chamber 23 provided with an olefin dichloride discharge line 24 and an inner pipe 25 disposed concentrically to provide an annular channel 26 communicating with a passage 27 leading into the reactor 10 at 28.

In operation olefin and chlorine are continuously introduced into the body of aqueous hypochlorous acid in reactor 10, the amount of olefin supplied being somewhat in excess, say from 5% to 30%, over the stoichiometric amount required to react with the chlorine to produce the olefin chlorohydrin. The olefin stream contains at least 50 mol percent. olefin and preferably in excess of 65 mol percent. Water is continuously supplied to top of scrubber 19 through line 20. The temperature of the water thus supplied may be within the range of from 32° to 200° F., preferably from about 60° to about 140° F.; the temperature of the body of solution 13 is within the range of from 130° to 320° F., preferably from 150° to 260° F. Body of solution 13 is maintained at a temperature above 212° F. only when operating under superatmospheric pressure. Pressure conditions within the reactor 10 and scrubbing tower 19 preferably are atmospheric; when operating with the body of solution 13 at temperatures above the boiling point of water, as noted above, superatmospheric pressure conditions are employed, for example, up to 5 atmospheres. The chlorohydrin solution is withdrawn from the reactor when the concentration of chlorohydrin is from 3% to 20% by weight, preferably about 3% to 12%.

In the production of ethylene chlorohydrin the preferred conditions when operating at a pressure up to 2 atmospheres absolute within the reactor and scrubber are as follows: temperature of scrubbing water from 60° to 130° F., maximum reaction temperature within reactor from 150° to 240° F., concentration of chlorohydrin solution within the reactor 3% to 12% by weight and ethylene concentration from 70% to 95% by volume. Operating at a pressure of 3 atmospheres absolute the preferred conditions are: temperature of scrubbing water from 100° to 140° F., maximum reaction temperature within reactor from 160° to 260° F., concentration of chlorohydrin solution within the reactor 3% to 12% by weight and ethylene concentration from 65% to 95% by volume.

The rate of withdrawal of the solution is correlated with the rate of addition of the chlorine, olefin and water; preferably the rates are correlated so that the chlorine, water and olefin are supplied continuously, a dilute chlorohydrin solution is withdrawn continuously and the body of aqueous hypochlorous acid within which the reactants are diffused is maintained at a constant level and concentration. The particular rate of feed of reactants and withdrawal of reaction products will, of course, depend on the capacity and design of the reactor, etc. By withdrawing a relatively dilute solution having a concentration below 15%, preferably from about 3% to about 12% of chlorohydrin, side reactions are minimized.

Operating in accordance with the above conditions, for example, by continuously diffusing a gaseous stream of ethylene containing from 65 to 95 mol perecent. ethylene and chlorine, preferably also in the gaseous phase, into a body of aqueous hypochlorous acid, the maximum temperature of which was from 150° to 260° F., and maintaining a pressure of from 1 to 5 atmospheres absolute in the reactor and scrubber, scrubbing the reaction gases with water at a temperature of from 60° to 140° F., removing ethylene dichloride from the resultant suspension and feeding residual scrubber liquid to the body of hypochlorous acid so as to avoid formation of a separate liquid phase of ethylene dichloride in the zone in which the reactants were diffused, it was found possible to operate continuously for indeterminate long periods of time without difficulty and with high yield of ethylene chlorohydrin. In the production of ethylene chlorohydrin the concentration of ethylene dichloride in the zone in which the reactants are diffused is preferably maintained at not exceeding .7% by weight.

Parts of Figure 2 like those of Figure 1 have been given the same reference characters. In the modification of Figure 2, reactor 10 has the product withdrawal line 17 communicating with storage tank 29 and has a scrubbing section 30 integral therewith. Packing 31 is disposed within this scrubbing section on a perforated tray 32. Water line 20 supplies water to this packing as in the modification of Figure 1. Disposed in the gas space 33 between the level 16 of the body 13 of aqueous hypochlorous acid and the perforated tray 32 is a line 34 for introducing an inert gas, such as carbon dioxide, nitrogen, flue gas, natural gas, methane, ethane or air. This inert gas flows with the unreacted gases through the scrubbing section 30 carrying with it olefin dichloride so that the olefin dichloride is not returned to the body 13 of aqueous hypochlorous acid therebelow.

The modification of Figure 3 differs from those of Figures 1 and 2 in that flow of scrubber liquid through reactor 10 takes place cocurrently with the flow of the reactants; the scrubber liquid is not introduced into the top of the reactor so that it flows downwardly countercurrent to the inert and unreacted gases leaving the reactor as in Figure 1. Parts of Figure 3, the same as those of Figure 1, are indicated by the same reference characters. In Figure 3 the top of reactor 10 is connected by a gas line 35 with the top of a decanter section 36 at the base of scrubbing tower 19. A line 37 leads from the top of decanter section 36 into the base of reactor 10 through which line the supernatant aqueous phase flows into the base of the reactor, flowing upwardly therethrough along with the reactants. A line 38 leads from the base of decanter section 34 for flow of olefin dichloride therethrough. An overflow line 39 leads from reactor 10 through which the olefin chlorohydrin reaction product flows to the storage tank.

In the operation of the apparatus of Figure 3, olefin and chlorine are continuously supplied to reactor 10 and cold water to scrubbing tower 19 through line 20. The olefin and chlorine react in the body of aqueous hypochlorous acid in which they are dispersed and diffused, the chlorohydrin solution thus produced being withdrawn through line 39. Inert and unreacted gases leave the top of reactor 10 through line 35, pass up through scrubbing tower 19 where they are washed with the cold water introduced through 20. The suspension thus produced enters decanter 36 where it stratifies into an upper aqueous layer which is fed to base of reactor 10 through line 39 and a lower olefin dichloride layer withdrawn through line 38. By removing the olefin dichloride from the liquid fed into the base of reactor 10 the formation of a separate phase of olefin dichloride in the zone in which the olefin and chlorine are diffused is prevented.

As in the other modifications, the maximum temperature within the body of solution 13 in reactor 10 of Figure 3 is within the range of from 130° to 320° F. and the pressure conditions within the reactor and scrubbing tower are preferably atmospheric, although superatmospheric pressure, for example, up to 5 atmospheres, may be employed.

The cocurrent method of Figure 3 results in smoother operation as compared with the countercurrent method of the other modifications in that it simplifies the maintenance of the desired liquid level in the reactor, and eliminates foaming difficulties. Further, a given reactor has been found to have a greater capacity for producing olefin chlorohydrin when operated with cocurrent flow therethrough as in Figure 3, rather than countercurrent flow as in Figure 1.

Satisfactory materials of construction for equipment for practicing the process of this invention are glass, chemical stoneware, or phenolformaldehyde asbestos compositions sold under the trade name "Haveg." The diffusion thimbles through which the chlorine and olefins are introduced into the body of hypochlorous acid may be made of fused crystalline aluminum oxide (Alundum) or an alumina silica mixture (Sillimanite) and may be of any well known type designed to cause diffusion of the chlorine and olefin in very small bubbles, thereby minimizing gas phase reactions which result in formation of dichloride rather than the desired chlorohydrin.

The examples, data on which are given in the tables below, were carried out in a glass reactor section having a 4 inch internal diameter and approximately 10 feet long. A scrubber was mounted above this reactor to the top of which water was supplied continuously. Just below the reaction section four gas diffusion thimbles were mounted, two of which were employed for the diffusion of ethylene and the other two for the diffusion of the chlorine. In one series of runs ethylene was used containing 95 mol percent. ethylene, the rest being chiefly methane and ethane. In another series of runs propylene was used, the concentration of which is indicated in Table II below. In commencing operation, water was introduced to fill the reactor to a height of about 4 feet above the diffusion thimbles. The ethylene and propylene were introduced at 2 to 3 pounds gauge pressure and their diffusion in the reactor increased the height of the liquid to approximately 9 feet. The reactor was operated at atmospheric pressure. The diffusion of chlorine into the liquid in the reactor resulted in an additional increase in the operating height to an average of about 9.25 feet above the diffusion thimbles. In runs 1 to 6 inclusive, the liquid was held at this level by withdrawing liquid from the bottom of the reactor at a rate correlated with the rate of introduction of the reactants. In run 7 propylene chlorohydrin solution was withdrawn from the top of the body of liquid in the reactor, as in Figure 3, and the level of the liquid thus maintained constant.

In runs 1 and 2 carbon dioxide flowing at a rate of three to four cubic feet per minute was used as flushing agent to remove ethylene dichloride from the suspension produced by scrubbing the reaction gases with water. In runs 3, 4, 5, 6 and 7 the scrubber liquid was introduced into a decanter, the olefin dichloride layer withdrawn and the aqueous layer fed to the reactor. In runs 1 to 6, inclusive, scrubbing liquid from which olefin dichloride has been removed flows into the top of the reactor in a direction counter-current to the exiting inert and unreacted gases; in run 7 such liquid enters the base of the reactor and flows upwardly therethrough cocurrently with the reactant gases.

TABLE NO. I

*Ethylene chlorohydrin*

| Run No. | Duration of Run, hrs. | Ethylene Lb. Mols/hr. | Chlorine Lb. Mols/hr. | Chlorine Mol Per Cent Theoretical |
|---|---|---|---|---|
| 1 | 2 | 0.1321 | 0.1128 | 85.4 |
| 2 | 4¼ | 0.1377 | 0.1270 | 92.2 |
| 3 | 3 | 0.1147 | 0.1060 | 92.4 |
| 4 | 5 | 0.1394 | 0.1228 | 88.1 |

TABLE NO. I (CONT'D)

| Run No. | Temperatures, °F. | | |
|---|---|---|---|
| | Base of Reactor | Above Thimbles | Water to Scrubber |
| 1 | 162 | 156 | 82 |
| 2 | 168 | 166 | 83 |
| 3 | 172 | 164 | 82 |
| 4 | 188 | 181 | 88 |

TABLE NO. I (CONT'D)

| Run No. | Product Analysis from Base of Reactor (wt. per cent) | | | |
|---|---|---|---|---|
| | Free Cl$_2$ | HCl | Ethylene Chlorohydrin | Ethylene Dichloride |
| 1 | nil | 2.78 | 5.79 | 0.50 |
| 2 | nil | 2.69 | 5.84 | 0.51 |
| 3 | 0.002 | 2.86 | 6.00 | 0.2 |
| 4 | nil | 3.21 | 6.71 | 0.1 |

TABLE NO. I (CONT'D)

| Run No. | Mols per 100 mols Cl$_2$ | |
|---|---|---|
| | Ethylene Chlorohydrin | Ethylene Dichloride |
| 1 | 93.4 | 6.6 |
| 2 | 92.8 | 6.6 |
| 3 | 87.3 | 10.4 |
| 4 | 86.2 | 13.9 |

TABLE NO. II

*Propylene chlorohydrin*

| Run No. | Duration of Run, Hrs. | Propylene Concentration | Propylene Lb. Mols/hr. | Chlorine Lb. Mols/hr. | Chlorine Mol Per Cent Theoretical |
|---|---|---|---|---|---|
| 5 | 2 | 91 | .0982 | .0888 | 90.4 |
| 6 | 2.75 | 99 | .1625 | .1118 | 68.8 |
| 7 | 2.75 | 99 | .1625 | .1118 | 68.8 |

TABLE NO. II (CONT'D)

| Run No. | Temperatures, °F. | | | |
|---|---|---|---|---|
| | Reactor Top | Reactor Middle | Above Thimbles | Water to Scrubber |
| 5 | 144 | 156 | 160 | 110 |
| 6 | 167 | 182 | 186 | 140 |
| 7 | 172 | 181 | 183 | 147 |

TABLE NO. II (CONT'D)

| Run No. | Product Analysis (Wt. Per Cent) | | | | Mols per 100 mols Cl$_2$ | |
|---|---|---|---|---|---|---|
| | Free Cl$_2$ | HCl | Propylene Dichloride | Propylene Chlorohydrin | Propylene Chlorohydrin | Propylene Dichloride |
| 5 | .03 | 2.75 | .91 | 5.48 | 77.5 | 22.4 |
| 6 | .01 | 2.83 | 1.00 | 4.91 | 69.3 | 24.2 |
| 7 | .01 | 2.81 | .64 | 5.88 | 72.7 | 20.1 |

Throughout the periods of the runs noted reactions between the olefin and chlorine proceeded smoothly and no difficulties were encountered. The runs were terminated when noted because it was found convenient to do so and not because of any operational difficulties. For comparative purposes it is noted that operating under substantially the same conditions, except that the scrubbing liquor was not treated to effect removal of olefin dichloride therefrom before return to the reactor, it was found impossible to continue reasonably satisfactory operation of the reactor after about two hours. At the end of this period coalescence of gas bubbles took place in the reactor and excessive amounts of unreacted gases escaped from the reactor.

It will be noted that this invention provides a process of producing olefin chlorohydrins in which a concentrated olefin stream and chlorine are diffused into a body of aqueous hypochlorous acid, which process overcomes the difficulties heretofore encountered when using a relatively concentrated olefin stream and is of high capacity and efficiency in that relatively high yields of olefin chlorohydrin result and the chlorohydrin solution removed from the reactor contains little or no by-product dichloride.

Since certain changes may be made in carrying out the above process without departing from the scope of the invention it is intended that all matter contained in the above description shall be interpreted as illustrative and not in a limiting sense.

What is claimed is:

1. The process of preparing an olefin chlorohydrin from an olefin of the group consisting of ethylene, propylene and mixtures of ethylene and propylene, which comprises diffusing a stream of said olefin containing at least 50 mol percent. of said olefin and chlorine into a body consisting of an aqueous solution of hypochlorous acid and other reaction products resulting from the reaction of chlorine and water while adding water to said body of hypochlorous acid, the chlorine and olefin being thus diffused in amounts such that not more than an excess of 30% of the olefin over the amount required to react with the chlorine to produce olefin chlorohydrin is introduced into said body, maintaining the concentration of olefin dichloride in the zone of said body into which said chlorine and olefin are diffused such that a separate liquid phase of olefin dichloride does not form in said zone, and withdrawing the solution of olefin chlorohydrin thus produced from said body.

2. The process of preparing ethylene chlorohydrin which comprises diffusing a stream of ethylene gas containing at least 50 mol percent. of ethylene and chlorine into a body consisting of an aqueous solution of hypochlorous acid and other reaction products resulting from the reaction of chlorine and water while adding water to said body of hypochlorous acid, the chlorine and ethylene being thus diffused in amounts such that not more than an excess of 30% of ethylene over the amount required to react with the chlorine to produce ethylene chlorohydrin is introduced into said body, maintaining the concentration of ethylene dichloride in the zone of said body into which said chlorine and ethylene are diffused such that a separate liquid phase of ethylene dichloride does not form in said zone, and withdrawing the solution of ethylene chlorohydrin thus produced from said body.

3. The process of preparing propylene chlorohydrin which comprises diffusing a stream of propylene gas containing at least 50 mol percent. of propylene and chlorine into a body consisting of an aqueous solution of hypochlorous acid and other reaction products resulting from the reaction of chlorine and water while adding water to said body of hypochlorous acid, the chlorine and propylene being thus diffused in amounts such that not more than an excess of 30% of propylene over the amount required to react with the chlorine to produce propylene chlorohydrin is introduced into said body, maintaining the concentration of propylene dichloride in the zone of said body into which said chlorine and propylene are diffused such that a separate liquid phase of propylene dichloride does not form in said zone, and withdrawing the solution of propylene chlorohydrin thus produced from said body.

4. The process of preparing ethylene chlorohydrin, which comprises continuously adding water to a body consisting of an aqueous solution of hypochlorous acid and other reaction products resulting from the reaction of chlorine and water at a temperature of from 130° to 320° F. and under a pressure such that said body is in the liquid phase, continuously diffusing chlorine and a stream of ethylene containing at least 50 mol percent. ethylene into said body of hypochlorous acid while maintaining the concentration of ethylene dichloride within the zone in said body in which the chlorine and ethylene are diffused not exceeding about .7% by weight, the chlorine and ethylene being thus diffused in amounts such that not more than an excess of 30% of ethylene over the amount required to react with the chlorine to produce ethylene chlorohydrin is introduced into said body, and continuously withdrawing the ethylene chlorohydrin thus produced from said body.

5. The process of preparing an olefin chlorohydrin from an olefin of the group consisting of ethylene, propylene and mixture of ethylene and propylene, which comprises establishing a body of an aqueous solution of hypochlorous acid at a temperature of from 130° to 320° F. and under a pressure such that said body is in the liquid phase, diffusing into said body a stream of said olefin containing at least 50 mol percent. of said olefin and chlorine, the chlorine and olefin being thus diffused in amounts such that not more than an excess of 30% of the olefin over the amount required to react with the chlorine to produce olefin chlorohydrin is introduced into said body, withdrawing from said body an olefin chlorohydrin solution containing from 3% to 20% by weight of olefin chlorohydrin, scrubbing the reaction gases leaving said body of solution with water, stratifying the scrubber liquid thus produced into an olefin dichloride layer and a aqueous layer, feeding the aqueous layer into said body of hypochlorous acid and removing the olefin dichloride layer.

6. The process of preparing ethylene chlorohydrin, which comprises establishing a body of an aqueous solution of hypochlorous acid at a temperature of from 150° to 240° F., continuously diffusing into said body chlorine and a stream of said ethylene containing from 70 to 95 mol percent. of ethylene, the chlorine and ethylene being thus diffused in amounts such that not more than an excess of 30% of ethylene over the amount required to react with the chlorine to produce ethylene chlorohydrin is introduced into said body, continuously withdrawing from said body of solution an ethylene chlorohydrin solution containing from 3% to 12% by weight of ethylene chlorohydrin, continuously scrubbing the reaction gases leaving said body of solution with water, continuously stratifying the scrubber liquid thus produced into an ethylene dichloride layer and an aqueous layer, continuously feeding the aqueous layer into said body of hypochlorous acid and continuously removing the ethylene dichloride layer.

7. The process of preparing propylene chlorohydrin, which comprises establishing a body of an aqueous solution of hypochlorous acid at a temperature of from 150° to 240° F., continuously diffusing into said body chlorine and a stream of said propylene containing from 70 to 95 mol percent. of propylene, the chlorine and propylene being thus diffused in amounts such that not more than an excess of 30% of propylene over the amount required to react with the chlorine to produce propylene chlorohydrin is introduced into said body, continuously withdrawing from said body a propylene chlorohydrin solution containing from 3% to 12% by weight of propylene chlorohydrin, continuously scrubbing the reaction gases leaving said body of solution with water, continuously stratifying the scrubber liquid thus produced into a propylene dichloride layer and an aqueous layer, continuously feeding the aqueous layer into said body of hypochlorous acid and continuously removing the propylene dichloride layer.

8. The process of preparing an olefin chlorohydrin from an olefin of the group consisting of ethylene, propylene and mixtures of ethylene and propylene, which comprises diffusing a stream of chlorine gas and a stream of said olefin gas containing at least 50 mol percent. of said olefin into a body consisting of an aqueous solution of hypochlorous acid and other reaction products resulting from the reaction of chlorine and water, the chlorine and olefin being thus diffused in amounts such that not more than an excess of 30% of the olefin over the amount required to react with the chlorine to produce olefin chlorohydrin is introduced into said body, scrubbing the reaction gases leaving said body of hypochlorous acid with water, contacting the scrubber liquid thus produced with an inert gas to remove olefin dichloride from said scrubber liquid, feeding the resultant scrubber liquid substantially free of olefin dichloride to said body of hypochlorous acid, and removing from the said body of hypochlorous acid olefin chlorohydrin solution having a concentration of olefin chlorohydrin of from 3% to 20% by weight.

9. The process of preparing ethylene chlorohydrin, which comprises diffusing a stream of chlorine and a stream of said ethylene containing at least 50 mol percent. of ethylene into a body consisting of an aqueous solution of hypochlorous acid and other reaction products resulting from the reaction of chlorine and water, the chlorine and ethylene being thus diffused in amounts such that not more than an excess of 30% of ethylene over the amount required to react with the chlorine to produce ethylene chlorohydrin is introduced into said body, scrubbing the reaction gases leaving said body of hypochlorous acid with water, contacting the scrubber liquid thus produced with an inert gas to remove ethylene dichloride therefrom, feeding the resultant scrubber liquid substantially free of ethylene dichloride to said body of hypochlorous acid, and removing from the said body of hypochlorous acid ethylene chlorohydrin solution having a concentration of ethylene chlorohydrin of from 3% to 20% by weight.

10. The process of preparing propylene chlorohydrin, which comprises diffusing a stream of chlorine and a stream of said propylene containing at least 50 mol percent. of propylene into a body consisting of an aqueous solution of hypochlorous acid and other reaction products resulting from the reaction of chlorine and water, the chlorine and propylene being thus diffused in amounts such that not more than an excess of 30% of propylene over the amount required to react with the chlorine to produce propylene chlorohydrin is introduced into said body, scrubbing the reaction gases leaving said body of hypochlorous acid with water, contacting the scrubber liquid thus produced with an inert gas to remove propylene dichloride from said scrubber liquid, feeding the resultant scrubber liquid substantially free of propylene dichloride to said body of hypochlorous acid, and removing from the said body of hypochlorous acid propylene chlorohydrin solution having a concentration of propylene chlorohydrin of from 3% to 20% by weight.

11. The process of preparing an olefin chlorohydrin from an olefin of the group consisting of ethylene, propylene and mixtures of ethylene and propylene, which comprises maintaining a body of an aqueous solution of hypochlorous acid at a temperature of from 130° to 320° F., diffusing into the base portion of said body a stream of chlorine and a stream of said olefin gas containing at least 50 mol percent. of said olefin, the chlorine and olefin being thus diffused in amounts such that not more than an excess of 30% of the olefin over the amount required to react with the chlorine to produce olefin chlorohydrin is introduced into said body, passing the reaction gases leaving said body of hypochlorous acid upwardly countercurrent to a descending stream of water, thereby scrubbing said reaction gases, stratifying the scrubber liquid thus produced into an olefin dichloride layer and an aqueous layer, removing the olefin dichloride layer, feeding the aqueous layer into the top portion of the said body of hypochlorous acid, and removing from the base of said body a solution containing from 3% to 20% by weight of olefin chlorohydrin.

12. The process of preparing ethylene chlorohydrin, which comprises maintaining a body of an aqueous solution of hypochlorous acid at a temperature of from 130° to 320° F., diffusing into the base portion of said body a stream of chlorine and a stream of ethylene gas containing at least 50 mol percent. of ethylene, the chlorine and ethylene being thus diffused in amounts such that not more than an excess of 30% of ethylene over the amount required to react with the chlorine to produce ethylene chlorohydrin is introduced into said body, passing the reaction gases leaving said body of hypochlorous acid upwardly countercurrent to a descending stream of water, thereby scrubbing said gases, stratifying the scrubber liquid thus produced into an ethylene dichloride layer and an aqueous layer, removing the ethylene dichloride layer, feeding the aqueous layer into the top portion of the said body of hypochlorous acid, and removing from the base of said body a solution containing from 3% to 20% by weight of ethylene chlorohydrin.

13. The process of preparing an olefin chlorohydrin from an olefin of the group consisting of ethylene, propylene and mixtures of ethylene and propylene, which comprises maintaining a body of an aqueous solution of hypochlorous acid at a temperature of from 130° to 320° F., diffusing into the base portion of said body a stream of chlorine gas and a stream of said olefin gas containing at least 50 mol percent. of said olefin, the chlorine and olefin being thus diffused in amounts such that not more than an excess of 30% of the olefin over the amount required to react with the chlorine to produce olefin chlorohydrin is introduced into said body, passing the reaction gases leaving said body of hypochlorous acid upwardly countercurrent to a descending stream of water, thereby scrubbing said gases, contacting the scrubber liquid thus produced with a stream of inert gas to remove olefin dichloride from said scrubber liquid, said stream of inert gas flowing cocurrently with said reaction gases and countercurrent to the descending stream of water, feeding the scrubber liquid leaving the zone of contact with the inert gas into the top portion of said body of hypochlorous acid, and removing from the base of said hypochlorous acid an olefin chlorohydrin solution containing from 3% to 20% by weight of olefin chlorohydrin.

14. The process of preparing ethylene chlorohydrin, which comprises maintaining a body of an aqueous solution of hypochlorous acid at a temperature of from 150° to 240° F., diffusing into the base portion of said body a stream of ethylene gas containing from 70 to 95 mol percent. of ethylene, the chlorine and ethylene being thus diffused in amounts such that not more than an excess of 30% of ethylene over the amount required to react with the chlorine to produce ethylene chlorohydrin is introduced into said body, passing the reaction gases leaving said body of hypochlorous acid upwardly countercurrent to a descending stream of water, thereby scrubbing said gases, contacting the scrubber liquid thus produced with a stream of inert gas to remove ethylene dichloride from said scrubber liquid, said stream of inert gas flowing cocurrently with said reaction gases and countercurrent to the descending stream of water, feeding the scrubber liquid leaving the zone of contact with the inert gas into the top portion of said body of hypochlorous acid, and removing from the base of said hypochlorous acid an ethylene chlorohydrin solution containing from 3% to 12% by weight of ethylene chlorohydrin.

15. The process of preparing an olefin chlorohydrin from an olefin of the group consisting of ethylene, propylene and mixtures of ethylene and proplyene, which comprises establishing a body of an aqueous solution of hypochlorous acid at a temperature of from 130° to 320° F., diffusing into the base of said body a stream of said olefin containing at least 50 mol percent. of said olefin and chlorine, the chlorine and olefin being thus diffused in amounts such that not more than an excess of 30% of the olefin over the amount required to react with the chlorine to produce olefin chlorohydrin is introduced into said body, scrubbing the reaction gases leaving said body with water, stratifying the scrubber liquid thus produced into an olefin dichloride layer and an aqueous layer, feeding into the base of said body the aqueous layer and causing the aqueous layer thus introduced to flow upwardly through said body, removing the olefin dichloride layer and removing from the upper portion of said body an olefin chlorohydrin solution at a rate to maintain the level of said body substantially constant.

16. The process of preparing ethylene chlorohydrin, which comprises establishing a body of an aqueous solution of hypochlorous acid at a temperature of from 150° to 240° F., diffusing into the base of said body chlorine and a stream of ethylene containing from 70 to 95 mol percent. of ethylene, the chlorine and ethylene being thus diffused in amounts such that not more than an excess of 30% of ethylene over the amount required to react with the chlorine to produce ethylene chlorohydrin is introduced into said body, scrubbing the reaction gases leaving said body with water at a temperature of from 60° to 130° F., stratifying the scrubbing liquid thus produced into an ethylene dichloride layer and an aqueous layer, feeding into the base of said body the aqueous layer and causing the aqueous layer thus introduced to flow upwardly through said body, removing the ethylene dichloride layer and removing from the upper portion of said body an ethylene chlorohydrin solution containing from 3% to 12% by weight of ethylene chlorohydrin at a rate to maintain the level of said body substantially constant.

17. The process of preparing propylene chlorohydrin, which comprises establishing a body of an aqueous solution of hypochlorous acid at a temperature of from 130° to 320° F., diffusing into the base of said body a stream of propylene containing at least 50 mol percent. of propylene and chlorine, the chlorine and propylene being thus diffused in amounts such that not more than an excess of 30% of propylene over the amount required to react with the chlorine to produce propylene chlorohydrin is introduced into said body, scrubbing the reaction gases leaving said body with water, stratifying the scrubber liquid thus produced into a propylene dichloride layer and an aqueous layer, feeding into the base of said body the aqueous layer and causing the aqueous layer thus introduced to flow upwardly through said body, removing the propylene dichloride layer and removing from the upper portion of said body a propylene chlorohydrin solution containing from 3% to 20% by weight of propylene chlorohydrin at a rate to maintain the level of said body substantially constant.

18. In the process of preparing an olefin chlorohydrin from an olefin of the group consisting of ethylene, propylene, and mixtures of ethylene and propylene, which comprises diffusing a stream of said olefin containing at least 50 mol percent. of said olefin and chlorine into a body consisting essentially of an aqueous solution of hypochlorous acid and other reaction products resulting from the reaction of chlorine and water, the chlorine and olefin being thus diffused in amounts such that not more than an excess of 30% of the olefin over the amount required to react with the chlorine to produce olefin chlorohydrin is introduced into said body, scrubbing the reaction gases leaving said body of solution with water and feeding the scrubbing liquid to said body of solution, the improvement which comprises removing olefin dichloride from the scrubbing liquid before feeding said liquid to said body of solution, thus maintaining the concentration of olefin dichloride in the zone of said body into which said chlorine and olefin are diffused such that a separate liquid phase of olefin dichloride does not form in said zone.

19. The process of preparing an olefin chlorohydrin from an olefin of the group consisting of ethylene, propylene, and mixtures of ethylene and propylene, which comprises continuously diffusing a stream of chlorine into a body consisting of an aqueous solution of hypochlorous acid and other reaction products resulting from the reaction of chlorine and water, said body being maintained under temperature and pressure conditions such that it is in the liquid phase, continuously adding water to said body, continuously diffusing a stream of said olefin containing at least 50 mol percent. of said olefin into said body, the chlorine and olefin being thus diffused in amounts such that not more than an excess of 30% of olefin over the amount required to react with the chlorine to produce olefin chlorohydrin is introduced into said body, continuously maintaining the concentration of olefin dichloride in the zone of said body into which said chlorine and olefin are diffused such that a separate liquid phase of olefin dichloride does not form in said zone, and removing from said body an aqueous solution of the ethylene chlorohydrin thus produced.

MAX NEUHAUS.

REFERENCES CITED

The following references are of record in the file of this patent:

UNITED STATES PATENTS

| Number | Name | Date |
| --- | --- | --- |
| 1,253,616 | McElroy | Jan. 15, 1918 |
| 1,295,339 | McElroy | Feb. 25, 1919 |
| 1,456,916 | Curme et al. | May 29, 1923 |
| 2,007,168 | Kautter | July 9, 1935 |
| 2,218,981 | Cohen et al. | Oct. 22, 1940 |
| 2,436,591 | Morrell et al. | Feb. 24, 1948 |

FOREIGN PATENTS

| Number | Country | Date |
| --- | --- | --- |
| 377,595 | Great Britain | July 28, 1932 |